March 10, 1959 D. G. HOLLOWAY 2,877,422

MODULATORS FOR ELECTRIC OSCILLATIONS

Filed April 30, 1951 2 Sheets-Sheet 1

INVENTOR
Dennis G. Holloway
By Ralph B. Stewart
attorney

MODULATORS FOR ELECTRIC OSCILLATIONS

Filed April 30, 1951

INVENTOR
Dennis G. Holloway
By Ralph B. Stewart
attorney

United States Patent Office 2,877,422

Patented Mar. 10, 1959

2,877,422

MODULATORS FOR ELECTRIC OSCILLATIONS

Dennis G. Holloway, Taplow, England, assignor to British Telecommunications Research Limited, Taplow, England, a company of Great Britain Application April 30, 1951, Serial No. 223,717

Claims priority, application Great Britain May 18, 1950

3 Claims. (Cl. 332—22)

Figure 1:
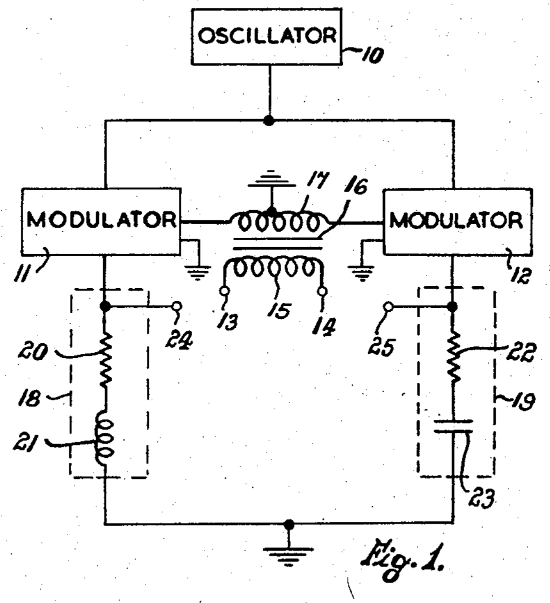

The present invention relates to modulators for electric oscillations.

It can be shown that an oscillation phase-modulated (and also to some extent amplitude-modulated) in dependence upon intelligence to be transmitted can be produced by generating two oscillations of the same frequency but 90° out of phase with one another, amplitude-modulating one of the oscillations with intelligence to be transmitted, suppressing the carrier of the amplitude-modulated oscillations and subsequently combining the other of the two oscillations with the two sidebands of the amplitude-modulated oscillation.

An example of apparatus for effecting modulation in this way is shown in Figure 51(*b*) on page 583 of Radio Engineers' Handbook, by F. E. Terman, published by the McGraw-Hill Book Company Inc., New York and London, 1943. A more detailed example is shown in Figure 12 on page 21 of Frequency Modulation by K. R. Sturley, published by Hulton Press Ltd., London.

Modulation effected in this way sometimes has advantages over phase or frequency modulation effected in other ways. For example, if the carrier frequency is of frequency $f_c$ and the modulating voltage is an oscillation of frequency $f_m$, provided the modulated oscillation is not passed through a non-linear circuit, such as a limiter, only the first two side-bands are present, that is to say the side-bands of frequencies $f_c \pm f_m$, whereas other phase modulators produce a large number of side-bands. The fact that only the first two side-bands are produced is of importance for example in multichannel telephony systems employing phase or frequency modulation. In such systems it is essential that one transmitter shall not transmit sidebands of frequencies which fall within the frequency-bands of other channels in the system.

An object of the present invention is to provide an improved modulator which has the aforesaid advantages but is of simpler construction and greater stability of adjustment than that of the aforesaid examples.

According to the present invention, apparatus for producing a modulated carrier oscillation comprises two networks adapted to be traversed by two carrier oscillations respectively of the same frequency and amplitude-modulated in anti-phase relatively to one another, each of the two networks comprising effectively two impedance elements connected in series and such that voltages developed, at the carrier frequency, across (*a*) two of the said impedance elements in the two networks respectively are in phase with one another, and (*b*) the other two of the said impedance elements are in anti-phase relatively to one another, and two output terminals connected to the two networks at two points respectively at which the modulation components of the two voltages in phase with one another are of substantially equal amplitudes, and at which the voltages in anti-phase with one another are of substantially equal mean amplitudes.

Further according to the present invention, apparatus for producing a modulated carrier oscillation comprises two networks adapted to be traversed by two carrier oscillations respectively of the same frequency, in phase with one another, and amplitude-modulated in anti-phase relatively to one another, the two networks comprising respectively a resistor in series with a capacitor and a resistor in series with an inductor, whereby voltages are developed at the carrier frequency and in phase with one another across the two resistors and voltages are developed at the carrier frequency and in anti-phase relatively to one another across the capacitor and inductor, and two output terminals connected to the two networks at two points respectively at which the modulation components of the two voltages in phase with one another are of substantially equal amplitudes, and at which the voltages in anti-phase with one another are of substantially equal mean amplitudes.

Thus the impedance of one of the networks may be represented by the expression $(A+jY)$ and the impedance of the other by $a(A-jbY)$, where A is the resistive component, $jY$ is the reactive component and $a$ and $b$ are constants. The two amplitude-modulated carrier currents may be represented by the expressions $I(1+M)$ and $mI(1-nM)$ where I represents the unmodulated carrier, M represents the modulating signal, and $m$ and $n$ are constants. Assuming the current $I(1+M)$ is flowing in the network of impedance $(A+jY)$ the voltage $V_1$ developed across this network is given by the equation $$V_1=I(1+M)(A+jY)$$

Similarly the voltage $V_2$ developed across the other network is given by the equation $$V_2=mI(1-nM)a(A-jbY)$$

The difference between $V_1$ and $V_2$ is given by the equation $$V_1-V_2=I[A(1+M-am+amnM)+jY(1+M+abm-abmnM)] \quad (i)$$

It will be seen that Equation (*i*) contains a component $IA(1+M-am+amnM)$ which represents a voltage in phase with I. In order that this voltage shall have its carrier suppressed, thereby leaving only the sum of the two pairs of side-bands represented by IAM and I*amn*AM respectively, the component referred to must be zero when M is zero. This condition is fulfilled when:

$$am=1 \quad (ii)$$

It will also be seen that Equation (*i*) contains an expression $jIY(1+M+abm-abmnM)$ which represents a voltage in quadrature with I. In order that this voltage shall be unmodulated $(M-abmnM)$ must equal zero. This condition is fulfilled when:

$$abmn=1 \quad (iii)$$

Figure 2:
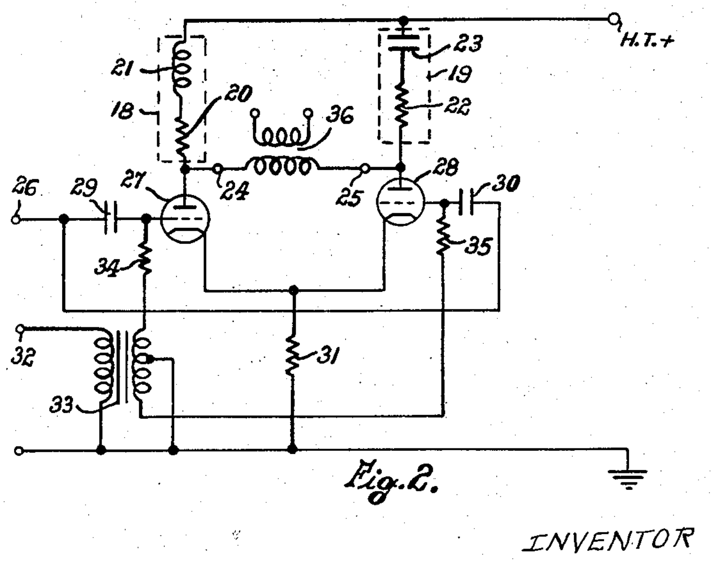
Figure 3:
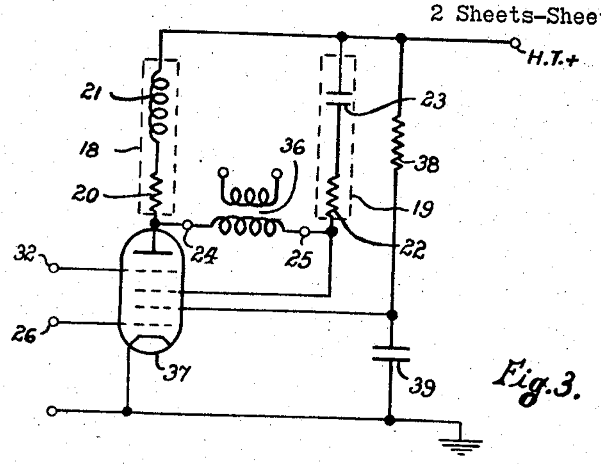
Figures 4, 5, 6:
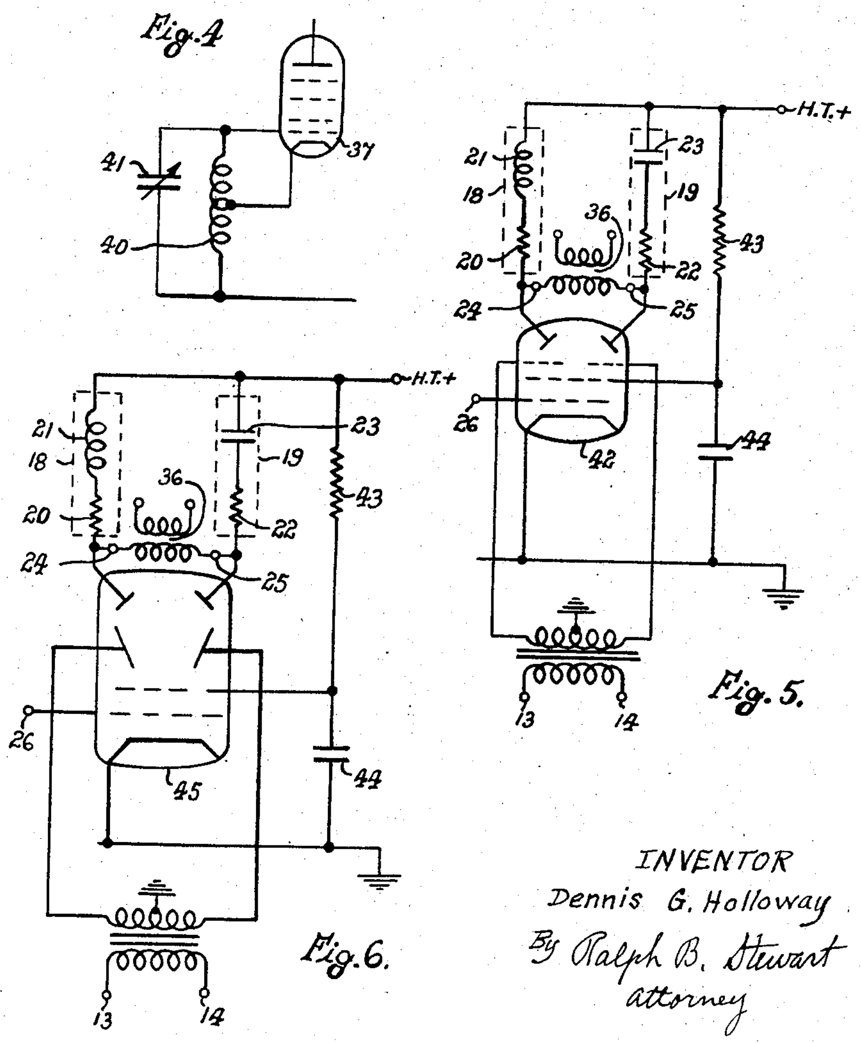

The invention will now be described, by way of example, with reference to the accompanying drawings, in which:

Figure 1 is a schematic diagram of one embodiment of the invention in which two separate amplitude-modulators are used, Figure 2 is a theoretical circuit diagram of a further embodiment in which two amplitude-modulators are used, Figure 3 is a theoretical circuit diagram of a further embodiment of the invention in which amplitude-modulation of two carriers is effected by means of a single valve, Figure 4 is a circuit diagram showing the manner in which the single valve of Figure 3 can be adapted to function as an oscillator as well as a modulator, and Figures 5 and 6 are theoretical circuit diagrams of two further embodiments of the invention in which only one valve is used.

Referring to Figure 1, the output of an oscillator 10 is applied to two amplitude-modulators 11 and 12 and signals at, say, speech frequency, to be transmitted are applied to terminals 13 and 14 of the primary winding 15 of a transformer 16. The centre point of the secondary winding 17 of the transformer 16 is earthed and the two ends of the secondary winding are connected to the amplitude-modulators 11 and 12 respectively. The speech signals applied to the two modulators 11 and 12 are therefore in anti-phase or phase-opposition relatively to one another.

The amplitude-modulated output from the modulator 11 is passed through a network shown within a broken line 18 and the amplitude-modulated output from the modulator 12 is passed through a network 19. The network 18 has a resistor 20 connected in series with an inductor 21 and the network 19 has a resistor 22 connected in series with a capacitor 23.

In this embodiment the resistors 20 and 22 are arranged to have equal values A, and the reactances of the inductor 21 and capacitor 23 are arranged to have equal values Y. It is also arranged that the currents flowing in the two networks are of equal amplitudes. The constants *a, b, m, n* in the previously mentioned mathematical equations are, therefore, in this example, each equal to unity and the conditions of Equations (*ii*) and (*iii*) are fulfilled. Other and more complex networks may, of course, be used, provided the networks are each effectively, at the carrier frequency, two impedance elements in series and such that the desired output is obtained. It will be understood that a reactor in shunt with a resistor can be regarded as being effectively a reactor in series with a resistor. It may, in fact, be found convenient to employ such an arrangement to provide efficient operation over a substantial band of frequencies. The amplitude-modulators may be of another suitable kind, and may, for example, comprise thermionic valves or dry contact type rectifiers.

Referring to Figure 2, this is a theoretical circuit diagram of a modulator according to the invention embodying two valves. The output of a source of carrier oscillations is applied between a terminal 26 and earth. The terminal 26 is connected to the control grids of two triode valves 27 and 28 through two capacitors 29 and 30 respectively, and the cathodes of the two valves are connected to earth through a common cathode resistor 31. The centre point of the secondary winding of the transformer 33 is connected to earth and the two ends thereof are connected to the control grids of the two valves 27 and 28 through grid leaks 34 and 35 respectively. The modulating signal is applied to the primary of transformer 33.

The network 18 is connected between the anode of the valve 27 and the positive terminal HT+ of a source of high tension (not shown) whose negative terminal is earthed. The network 19 is connected between the anode of the valve 28 and the terminal HT+, and the output terminals 24 and 25 are connected to the primary winding of an output transformer 36.

It will be seen that in this arrangement the carrier oscillation is applied to the control grids of the two valves in phase, whereas the signals to be transmitted are applied to the control grids in anti-phase, that is, in phase opposition. The anode currents of the two triodes contain therefore oscillations at the carrier frequency amplitude-modulated in anti-phase by the signals. It can conveniently be arranged that the anode currents in the two valves are equal, that the resistors 20 and 22 are equal and that the reactances of the inductor 21 and the capacitor 23 are also equal at the carrier frequency.

Figure 3 shows a modulator according to the invention embodying only one valve which is a hexode 37. The carrier oscillation in this example is applied between the first grid (control grid) of the hexode and the cathode, and the signals to be transmitted are applied between the fourth grid (suppressor grid) and cathode of the valve. The second grid (a screen grid) of the hexode is connected to the terminal HT+ through a resistor 38, and to earth through a decoupling capacitor 39.

In this example oscillatory current at carrier frequency flows to the anode and to the third grid. The anode is connected to the terminal HT+ through the network 18 and the third grid is connected to the terminal HT+ through the network 19. The division of current between the anode and the third grid is controlled by the modulating potential on the fourth grid and applied at terminal 32. When this potential is positive-going the current to the anode increases and that to the third grid decreases and vice versa. The output appearing at the terminals 24 and 25 is applied to a transformer 36 as in Figure 2. The screening grid (second grid) while not essential is preferable as it serves to prevent the voltage on the third grid from influencing the total flow of current from the cathode.

Instead of generating the carrier oscillation in a separate oscillator the valve 37 may conveniently be arranged to act as the source of carrier oscillations. For example, as shown in Figure 4, a tuned circuit comprising an inductor 40 and tuning capacitor 41 may be connected between the first grid and earth and the cathode of the valve 37 connected to a suitable tapping point on the inductor 40 in accordance with known technique.

Figure 5 shows a further arrangement according to the invention embodying a balanced twin valve 42. This valve has a single cathode and two anodes. Adjacent the cathode is disposed a first grid which controls the total flow of current from the cathode to the two anodes. A second grid is provided for screening purposes, and for each anode there is provided a separate modulator grid. The carrier oscillation is applied to the first grid and the signals to be transmitted are applied in anti-phase to the two modulator grids. The second (screen) grid which, although preferably provided is not essential, is connected to the terminal HT+ through a resistor 43 and to earth through a decoupling capacitor 44. One of the anodes is connected to the terminal HT+ through the network 19. The screen grid may, if desired, be disposed between the modulator grids and the anodes instead of between the modulator grids and the first grid as shown. As in the arrangement of Figure 3 the valve 42 may conveniently be arranged to act as the source of carrier oscillations as well as the modulator.

The arrangement of Figure 6 is the same as that of Figure 5 with the exception that the modulator grids are replaced by deflection plates which serve to deflect the stream of electrons in the valve between the two anodes in dependence upon the signals to be transmitted. As in the arrangements of Figures 3 and 5 the valve 45 may conveniently be arranged to act as the oscillator as well as the modulator, and again the screen grid, although desirable, is not essential.

It will be understood that the resistor 20 may be provided by the resistance of the winding of the inductor 21.

Known technique may be used to generate frequency-modulated signals by means of a phase-modulator according to the invention. For example, the modulating signals before being applied to the modulator may be passed through a network of known type which attenuates signals of high frequency relatively to those of low frequency. A simple network of this type comprises a resistor connected in series with a capacitor, the output being taken from across the capacitor.

It will be noted that in all forms of the invention illustrated in the drawing, the two networks are effectively connected in series opposition in the output circuit, whereby the output circuit is energized by the vector difference between the voltages developed across the two networks.

The term "anti-phase" as used herein denotes the fact that the two carrier oscillations are modulated in opposite senses, that is, when the amplitude of one carrier oscillation is being reduced by the modulating signal the amplitude of the other carrier oscillation is being increased, and vice versa.

In each form of the invention described herein, the two networks 18 and 19 are connected as a three-terminal network formed of two circuit paths connected respectively between the input terminals of the two networks 18 and 19 and a common output terminal which is connected through the anode current supply source to the cathode of the electron discharge modulator tube or tubes.

I claim:

1. Apparatus for phase-modulating a constant-frequency carrier oscillation, comprising a source of carrier oscillations of constant frequency, means producing from said source two carrier oscillations of the same constant frequency but amplitude-modulated in anti-phase relatively to one another, a first network comprising effectively a first impedance element connected in series with a second impedance element, a second network comprising effectively a third impedance element connected in series with a fourth impedance element, connections for passing the said constant-frequency, amplitude-modulated carrier oscillations through said two networks respectively to develop voltages at the frequency of said carrier oscillations and in phase with one another across said first and third impedance elements and to develop voltages at the frequency of said carrier oscillations and in anti-phase relatively to one another across said second and fourth impedance elements, and an output circuit connecting said two networks in series opposition and being responsive to the vector difference between the voltages developed across the two networks.

2. Apparatus for phase-modulating a constant-frequency carrier oscillation, comprising means producing two carrier oscillations of the same constant frequency and amplitude-modulated in anti-phase relatively to one another, a first network comprising effectively a first resistor in series with a capacitor, a second network comprising effectively a second resistor in series with an inductor, connections for passing said constant-frequency, amplitude-modulated carrier oscillations through said networks respectively, and an output circuit connecting said two networks in series opposition and being responsive to the vector difference between the voltages developed across the two networks.

3. Apparatus for phase-modulating a constant-frequency carrier oscillation comprising means producing two carrier oscillations of the same constant frequency and amplitude-modulated in anti-phase relatively to one another, a first network comprising effectively a first impedance element connected in series with a second impedance element, a second network comprising effectively a third impedance element connected in series with a fourth impedance element, said first and third elements having impedances of like character and said second and fourth elements having reactances of opposite character, connections for passing said constant-frequency, amplitude-modulated carrier oscillations through said two networks respectively to develop voltages across said networks at the frequency of the said carrier oscillations, and an output circuit connecting said two networks in series opposition and being responsive to the vector difference between the voltages developed across the two networks.

References Cited in the file of this patent

UNITED STATES PATENTS

| | | |
|---|---|---|
| 1,834,975 | Scheppmann | Dec. 8, 1931 |
| 2,140,769 | Schienemann | Dec. 20, 1938 |
| 2,408,684 | Roberts | Oct. 1, 1946 |
| 2,576,429 | Villard | Nov. 27, 1951 |